United States Patent
Clare et al.

(10) Patent No.: US 7,409,208 B1
(45) Date of Patent: Aug. 5, 2008

(54) SELF-SUBSCRIPTION TO CATALOGS OF MOBILE APPLICATION SOFTWARE

(75) Inventors: Varsha Clare, Pleasanton, CA (US); Michael Donald Salmon, Berkeley, CA (US); Jeffrey S. Lee, Antioch, CA (US)

(73) Assignee: Cellco Partnership, Basking Ridge, NJ (US)

( * ) Notice: Subject to any disclaimer, the term of this patent is extended or adjusted under 35 U.S.C. 154(b) by 1062 days.

(21) Appl. No.: 10/610,566

(22) Filed: Jul. 2, 2003

(51) Int. Cl.
H04M 3/00 (2006.01)

(52) U.S. Cl. .................. 455/419; 709/219; 717/178; 707/10

(58) Field of Classification Search .......... 455/414, 455/418, 419; 709/217, 246, 10, 219; 707/10; 345/744; 717/178
See application file for complete search history.

(56) References Cited

U.S. PATENT DOCUMENTS

| | | | |
|---|---|---|---|
| 5,694,546 A | 12/1997 | Reisman | |
| 5,887,254 A | 3/1999 | Halonen | |
| 6,023,620 A | 2/2000 | Hansson | |
| 6,029,065 A | 2/2000 | Shah | |
| 6,125,388 A | 9/2000 | Reisman | |
| 6,138,009 A | 10/2000 | Birgerson | |
| 6,370,389 B1 | 4/2002 | Isomursu et al. | |
| 6,549,770 B1 | 4/2003 | Marran | |
| 6,557,054 B2 | 4/2003 | Reisman | |
| 6,961,417 B2 * | 11/2005 | Koch | 379/207.02 |
| 2002/0040326 A1 | 4/2002 | Spratt | |
| 2002/0107795 A1 | 8/2002 | Minear et al. | |
| 2002/0142762 A1 | 10/2002 | Chmaytelli et al. | |
| 2003/0032417 A1 | 2/2003 | Minear et al. | |
| 2004/0203681 A1* | 10/2004 | Ross et al. | 455/418 |

OTHER PUBLICATIONS

"Brew at a Glance", http://qualcomm.com/brew/about/ataglance.html, pp. 1-3.
"Fact or Fiction?", http://www.qualcomm.com/brew/about/factorfiction.html, pp. 1-2.
"About Brew?", http://www.qualcomm.com/brew/about/aboutbrew.html, pp. 1-2.
"The Road to Profit is Paved with Data Revenue", Qualcomm Internet Services White Paper, pp. 1-23.

* cited by examiner

Primary Examiner—Olisa Anwah
(74) Attorney, Agent, or Firm—McDermott Will & Emery LLP

(57) ABSTRACT

A software download service on a mobile network provides users with personalized catalog presentations identifying software products available for downloading. Customer-specific preferences are established, for example, by input by the customer using a web-interface on a personal computer or on their mobile station, or by processing of user data such as demographics and usage history. The resulting user preferences are stored in a database. When each customer operates a mobile station to access the download service, the listing(s) of available software products are filtered and/or prioritized using the customer's individual preference(s). As a result, the service provides a 'catalog' of available software products that has been tailored to the particular user based on that user's preference(s). Consequently, customers can easily find applications that appeal to their interest, which improves both the sales take rate and the customer experience.

10 Claims, 3 Drawing Sheets

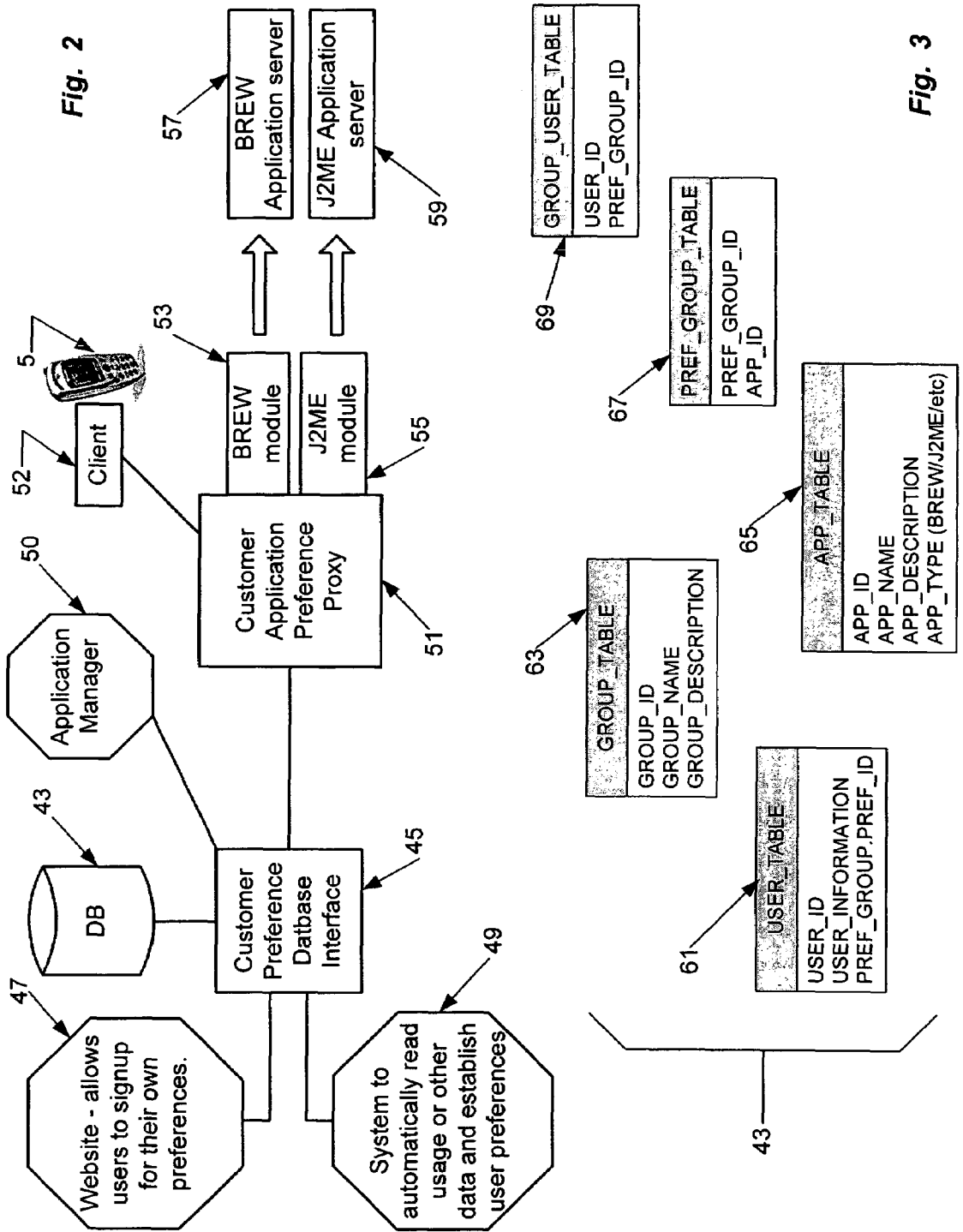

SELF-SUBSCRIPTION TO CATALOGS OF MOBILE APPLICATION SOFTWARE

TECHNICAL FIELD

The present subject matter relates to techniques and equipment to allow tailoring of software application catalogs or the like, for applications available for downloading to users' mobile stations, based on user-specific criteria.

BACKGROUND

In recent years, cellular or personal communication service type mobile devices have emerged as a must-have appliance among mobile professionals and consumers alike, growing in popularity every year since they were first introduced. The public has come to accept that mobile communication service enhances business and personal communications and may contribute to personal security. Consequently, mobile communication is becoming increasingly popular. Although originally designed and deployed to offer voice-grade telephone services, more recently the mobile stations and the networks that provide service through them have offered an expanding array of data communication services and other related services.

Manufacturers have developed wireless devices, such as cellular telephones, with increasing processing power, fast approaching the computing capabilities of devices such as personal computers and personal digital assistants ("PDAs"). Because of this increased processing power, mobile stations actually can be programmed to perform a wide range of application functions, for example related to tools for productivity enchantment, gaming, entertainment and the like. However, due to their small size, the program storage capacity of the mobile station typically is quite limited.

A number of different vendors have developed competing approaches to downloading application software into the mobile stations. Generally, the mobile station has embedded software, including an operating system and an application program interface (API). Although the station hardware and/or the operating system may be unique and even proprietary, the API is a published standard. As a result, virtually any software developer can write application programming to the API, and the application program will run properly on all mobile stations implementing the API. Qualcomm products, for example, utilize the binary runtime environment for wireless ("BREW") as the API. Java 2 Platform, Micro Edition (J2ME™) is another runtime environment targeted to a wide range of consumer products, which some cellular telephone developers are utilizing for the standardized API.

Based on these APIs, a number of the carriers, vendors and third parties are now offering application downloading as an additional pay service, through the wireless networks. Mobile station users can customize their wireless telephones through the selective downloading of applications of interest, such as games, printed media, stock updates, news, or any other type of information or application that is available for download through the wireless network. The user pays for the downloaded software as well as any airtime used for the download. Many of the applications, such as games and calendar programs, are run on the station off-line, without ongoing communications through the wireless network. Some of the downloaded applications, however, stock or news update routines for example, use the communication capabilities of the mobile station and the network to implement at least some ongoing application functionality.

To offer product software downloading as a commercial service, the carrier or a third party vendor operates an application download server (ADS) on a packet-switched data network, which is accessible by a data call from a compatible mobile station. In general, a user having a mobile station with an API and having subscribed to the download service initiates a data call through the network to the ADS. After log-in, the station receives and displays one or a series of menus listing available applications. The user views the list of available applications and makes a selection, which the mobile station communicates through the network to the ADS server. The server then transmits the selected application through the network to the mobile station, and the mobile station stores the new program in memory. Subsequently, the processor of the mobile station calls-up and executes the downloaded application program, for example, allowing the user to play a new game on the mobile station.

Such download services are gaining in availability and popularity; and software developers are rapidly providing a wealth of new applications. To date, software sold on such platforms is presented as an identical list or menu tree for all users with the same type of mobile station (client). Every user must look through a long list of all applications to find each individual item that may be interesting to her or him. As the number of applications and/or downloadable content available on a given service increases, so to does the length of the menu, and this menu for software-product selection becomes less and less effective.

Hence, a need exists for a more convenient way to offer available software to mobile station users for selection and downloading.

SUMMARY

The concepts disclosed herein alleviate the above noted problems with mobile services that download selected software into users' mobile stations. The concepts essentially provide personalized presentations of information about the applications and the like that are available for downloading, to tailor the presentations to each user's personal interests. If customers can easily find applications that appeal to their interest, the sales take rate and the user experience quality can both improve.

In one aspect, a method enables distribution of software to one of the mobile stations served through a wireless communication network. The method involves receiving a preference for a user of the one mobile station. The method also involves receiving a request for access to a software distribution service, through the wireless communication network, from the one mobile station. Information regarding the available software is processed in accord with the received preference, to produce a personalized catalog of available software for the user. For example, the processing may filter or prioritize information regarding available application and/or content software.

The method entails transmitting this personalized catalog to the one mobile station, for presentation to the user. The user may review the presentation and select one or more applications or other items of software, typically, from the personalized presentation, although the examples allow the user to obtain default catalogs or other presentations if the personalized catalog is not used on a given occasion. The mobile station transmits a user selection of software, and in response, the selected software is downloaded into the user's mobile station through the network.

The receiving of a preference may involve an on-line interactive session with the user. In the examples, the user accesses a web server, from the mobile station or from another data device communicating via the Internet. Similar preferences may be derived, or user selected preferences may be modified, in accord with other data relating to the particular user. Examples of such other data used for developing preferences include demographic data about the users and users' history of usage, for example, a user's history of data communication through the network and/or history of usage of the download service. In the examples, a resultant preference may define a filter criteria or a priority order.

Another aspect of the disclosed subject matter relates to an apparatus for distributing software to mobile stations through a wireless communication network. This apparatus includes a system for receiving user selections and downloading software to the mobile stations through the wireless communication network. Means, associated with the system, are provided for developing and sending personalized catalogs of available software to users of mobile stations.

In the examples, the means comprises and a customer application preference proxy. A subscription server and/or a system processing other user-related data may be used to develop the users' preferences. A database stores the user preferences and data regarding available software; and a user interface performs the catalog filtering as well as database management.

A disclosed embodiment of a system for distributing software comprises a subscription server for on-line user interactivity, to enable the user to input a preference, and a profile database storing the user's preference. An application download server, coupled to the wireless communication network, stores a plurality of software applications that are available for downloading into mobile stations. The exemplary system also includes a customer application preference proxy. In operation, the proxy receives a request for service from a mobile station associated with the user and obtains filtered information regarding the software applications available for downloading from the application download server. Specifically, the information regarding the available software applications is filtered in accord with the stored user's preference, to form a personalized software catalog. The proxy transmits the personalized software catalog through the wireless communication network to the user's mobile station.

In an embodiment of the system, the subscription server may be a web server. Preferably, the web server is accessible from the user's mobile station as well as from a data communication device coupled for communication via the Internet. Other systems provide preference information based on other user specific data, such as demographics and usage history.

In one embodiment, the application download server stores application programs compatible with two or more mobile station program standards. In the example, the server stores both BREW (binary runtime environment for wireless) type application programs and J2ME (Java 2 Platform, Micro Edition) type application programs.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 2 a functional block diagram of the software for customizing catalogs based on the user preferences and distributing software, accordingly.

FIG. 3 shows an exemplary database schema, which may be used to produce the catalogs based on the user preferences.

DETAILED DESCRIPTION

Figure 1:
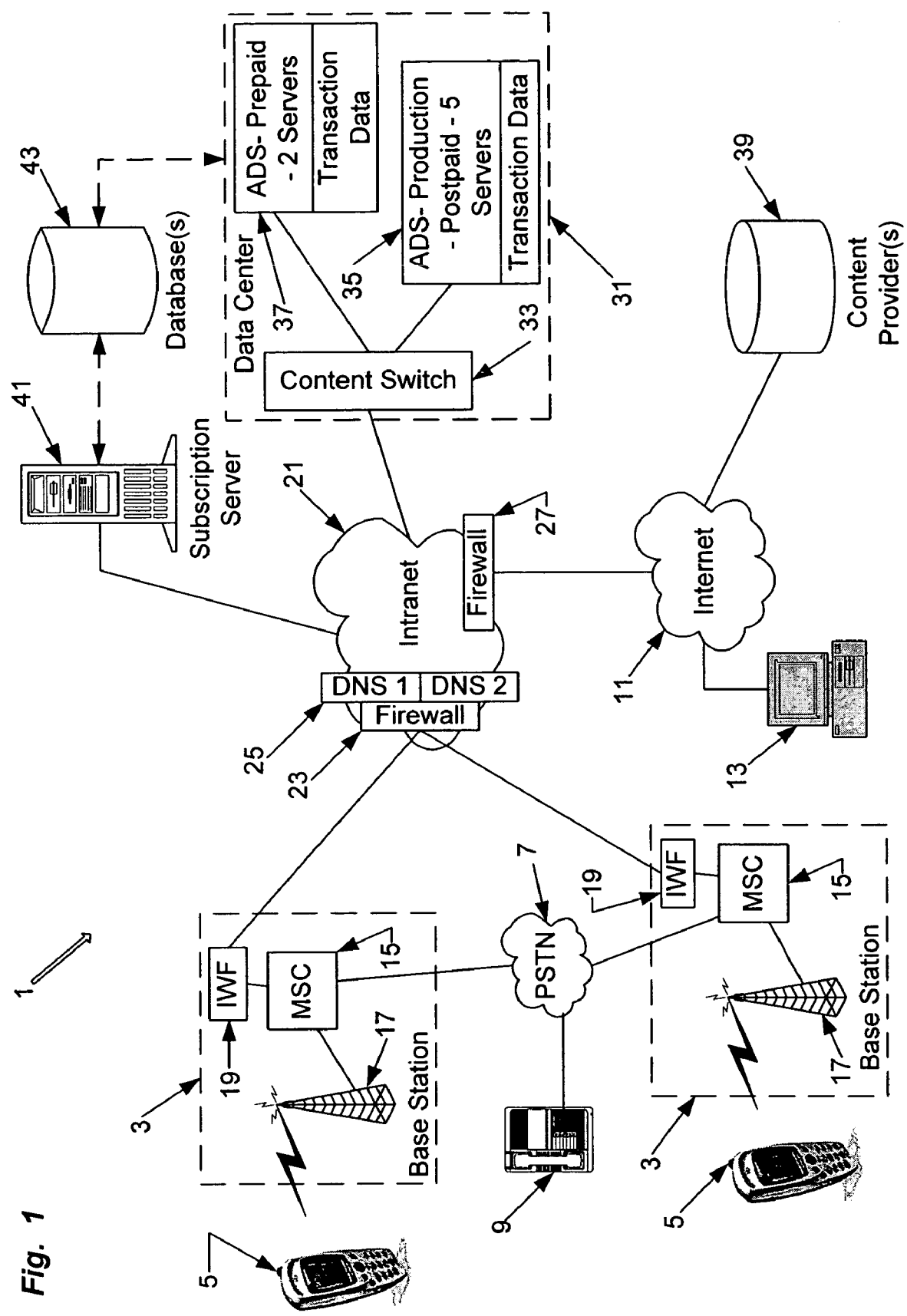
FIG. 1 is a functional block diagram of an exemplary wireless communication network, providing software distribution to mobile terminals, with software catalogs based on user preferences.

It is proposed herein to provide mobile station users with personalized catalog displays or the like of software products available for downloading into their mobile stations. Essentially, a customer-specific preference is established, for example, by input by the customer using a web-interface on a personal computer or on their mobile station. When the customer operates the mobile station to access the download service, the server processes the catalog(s) of available software products using the customer's individual criteria, for example to filter or prioritize the information about available products. As a result, the server sends a menu or 'catalog' of the available software products that has been pre-screened and/or limited based on the customer's criteria. For example, the customer may specify areas of particular interest, in which case, the customer receives a listing of software meeting the interest criteria. A list may be prioritized in accord with user specified criteria. Demographic data and/or usage history also may be used to establish and/or refine a customer's personal preference(s).

In one example, a web interface and backend database support the user selection of preferences for personalized catalogs of available software. Via either PC or mobile station access, the user creates and edits his or her own personal profile. Preferences are also created and/or modified based on processing of other user data. When the user connects to the download system, a server queries the database and obtains the users profile, for example, based on the mobile identification number (MIN) of the user's mobile station. After the profile is retrieved, the data detailing items of available software are filtered or prioritized based on this user's preference profile. This approach allows the user's browsing experience to be more manageable and more user-friendly. Of course those skilled in the art will recognize that these principles are applicable in systems for downloading applications software to mobile devices, such as systems for BREW or systems for J2ME (Java.™ 2 Platform, Micro Edition) type software distribution, as well as systems for downloading content to mobile devices.

As used here, a "catalog" is any type of information to inform a user of the contents of a repository, typically indicating items available for purchase or other form of distribution. A catalog may be a simple list or menu in text or audio form, or a catalog may enable a more sophisticated multimedia presentation outlining the contents of the catalog to the user. For example, a catalog of available software provides a listing or other form of presentation informing the user of the programs and/or software content items that are available from the download service, typically, for purchase in exchange for a monetary price. One type of software catalog may be a default menu or tree of menus, providing a listing of all available programs (or at least all programs compatible with the user's mobile station). As discussed in more detail below, the systems disclosed herein enable the user to customize a catalog of available software, to allow individually selected presentation of the catalog information about the available items, e.g. the applications or other multimedia content items available for downloading to the user's mobile station.

In one example, the user may limit the software items displayed in his or her personal catalog, by inputting a selection, which is used to define one or more filter criteria. As another example, the user may specify priorities, so that although all available items are listed, preferred programs or multimedia content items appear higher or even first in the catalog. The system may remove items from the personalized catalog that have previously been downloaded and are already resident in the user's mobile station. The catalog listings based on user inputs may be refined with demographic data. The system may modify catalogs based on usage data, for example, so as to highlight new versions of previous program selections or new products similar to previous selections. Alternatively, the user preferences may be defined automatically by the demographic or usage information, or the like. Of course, those skilled in the art will recognize that the customizing of the catalogs may utilize a variety of other personal criteria, to provide each individual user with a personalized catalog presentation.

Reference now is made in detail to the examples illustrated in the accompanying drawings and discussed below. The software product downloading may be offered through any second or third generation (2G or 3) wireless network supporting digital data communications, such as ISA-95 or 1xRTT. Although those skilled in the art are presumably familiar with the structure and operation of such networks, it may be helpful to briefly summarize an exemplary network and the context it provides for the application downloading service.

FIG. 1 depicts a wireless service communication network 1 for providing voice telephone communications as well as data services. As shown, the system 1 includes regional wireless communication networks 3 that provide wireless telephone or personal communications service (PCS) type communication to and from mobile stations, depicted by way of example as mobile handsets 5 in different service areas. Each network 3 enables users of the mobile stations 5 to initiate and receive telephone calls to each other as well as through the public switched telephone network (PSTN) 7 to and from telephone devices 9. Each network 3 also enables users of appropriately equipped mobile stations 5 to initiate and receive various data communications, for example via the public data network referred to as the Internet 11, for example to send or receive data from other digital devices represented by the exemplary computer 13, as will be discussed later.

The mobile stations 5 may take many forms. For example, some mobile stations may be mobile telephone stations with display and user input capabilities to support browsing and data communications capabilities to support the software download service. Other mobile stations may comprise portable digital assistants (PDAs) with built-in wireless communication capabilities. Today, available PDAs support J2ME, and PDAs that support BREW will soon be commercially available. As another alternative, a wireless device such as a mobile telephone having data communication capabilities may be connected to a portable computing device such as a handheld or laptop type computer.

Each network 3 provides these wireless communication services for mobile stations 5 in accord with a digital protocol or an analog protocol or both. Each regional network 3 includes a mobile switching center (MSC) 15. Each MSC 15 connects through trunk circuits to a number of base stations 17, which the respective MSC controls.

The base station or base transceiver system (BTS) at 17, is the part of the radio network 3 that sends and receives RF signals to/from the mobile stations 5 that the base station currently serves. The base station 17 connects to and communicates through the antenna systems on a radio tower. The base station 17 contains the transmitters and receivers at a site and is responsible for the control, monitoring, and supervision of calls made to and from each mobile station 5 within its serving area or "cell", over the wireless air link. The base station 17 assigns and reassigns channels to the mobile stations 5 in its area and monitors the signal levels to recommend hand-offs to other base stations (not shown).

Each network 3 typically includes a base station controller (BSC) functionality that controls the functions of a number of the base stations 17 and helps to manage how calls made by each mobile station 5 are transferred (or "handed-off") from one serving base station 17 to another. Each wireless network equipment vender implements this function differently. Some vendors have a physical entity, which they call a BSC, while other vendors include this functionality as part of their mobile switching center (MSC). For convenience of illustration, it is assumed that the BSC functionality in the network 3 is incorporated into the MSC 15.

Each mobile station 5 includes a transceiver compatible with one or more types of wireless network 3. The mobile stations 5, the MSCs 15 and the base stations 17 implement one or more standard air-link interfaces. For example, the wireless telephone network may support dual-mode services. Although not shown separately, such a dual-mode network includes wireless telephone components that output analog telephone signals for transmission according to an analog wireless protocol (e.g., AMPS) as well as digital wireless system components that operate in accord with a digital wireless protocol, for example the CDMA protocol IS-95. The base stations may provide both types of services. Alternatively, the network may comprise base stations that send and receive voice and signaling traffic according to the prescribed analog protocol as well as digital base stations that utilize the digital wireless protocol. Each dual-mode MSC typically includes a switching subsystem for analog telephone services, a switching subsystem for digital telephone services, and a control subsystem. Other MSCs may implement only one type of service. The mobile stations 5 often include at least corresponding dual mode capability, and today, often are capable of a third mode, to allow operation in networks 3 utilizing an alternative digital protocol or frequency band for digital voice and/or data service.

Digital wireless equipment is available today to support any one of several common interface standards, including time division multiple access (TDMA) and the Global System for Mobile communications (GSM). In the preferred embodiment, the digital wireless telephone components support the code division multiple access (CDMA) standards.

With CDMA, each transmitted signal comprises a different pseudorandom binary sequence, also referred to as a pseudonoise (PN) sequence, which modulates a carrier signal, spreading the spectrum of the waveform. Thus, since each CDMA subscriber unit is assigned a unique PN code, a plurality of subscriber stations can send and receive CDMA signals sharing the same frequency spectrum. If these CDMA signals were viewed in either the frequency or time domain, the multiple access signals would appear to be superimposed on top of each other. The CDMA signals are separated in the receivers of the base stations or the subscriber stations by using a correlator which accepts only signal energy from the selected binary PN sequence and despreads its spectrum. The CDMA signals from other sources, whose codes do not match the selected binary PN sequence, are not despread in bandwidth and as a result, contribute only to the background noise and represent a self-interference generated by the system.

In the example, through the MSC 15 and the base stations 17, a network 3 provides voice-grade telephone services over the common air interface to and from the mobile stations 5. The networks 3 also provide data communications services to at least some of the mobile stations 5. For the data services, each regional network 3 includes an inter-working function (IWF) node 19 coupled to the MSC 15. A third generation wireless network provides a Packet Data Serving Node (PDSN) to support data services. The IWF node 19 (or PDSN) provides packet data routing to enable packet data communications over the logical communication channels of the wireless air interface, for example for the communications via the Internet 11.

In the illustrated network, the IWF node 19 connects to a private intranet type packet-switched data network 21. A firewall 23 provides security, and one or more domain name servers (DNSs) 25 provide address translations, as is common in the art, to facilitate the packet switched data communications through the intranet 21 and when desired through the public Internet 11. A second firewall 27 provides security with regard to communications to/from the Internet 11.

Elements of the network 1 described to this point are essentially standard components of advanced wireless or mobile networks. Although the precise names and configurations of such elements and the protocols used between such elements may vary, those skilled in the art should be familiar with the different variations in the technology and understand the applicability of the concepts discussed herein to various embodiments of the wireless communications network 1.

The exemplary network 1 also includes a number of data communication elements that facilitate ordering and downloading of software into the mobile stations 5. The present concepts are applicable to downloading of executable applications programs and related content materials, as well as to systems for downloading of pure content (e.g. text, audio, video, multimedia, etc.). For purposes of presenting an example, it will be assumed that the download service distributes executable applications, and possibly some content manipulated by such applications.

It is assumed that the mobile stations 5 are of a type implementing one of several common application program interfaces (APIs) under the different software standards for mobile stations, such as BREW, J2ME or the like. Compatible stations 5 thus are capable of receiving compatible software downloads and locally running the downloaded application software, albeit for the respective one of the software standards that the particular station 5 supports. To conduct such downloading, the stations 5 also are capable of packet data communications through the network 1, although such data communications of course enable a variety of other communication applications/services through the network 1.

To utilize the download service, a user with a mobile station 5 initiates a packet data communication session or "call" through the network 1 to a data center 31. A nationwide carrier may operate a number of data centers 31; and the network may provide similar access to data centers (not shown) of third party software providers.

In response to a data call from the mobile station 5 to the user-selected service provider, the network 1 provides the appropriate wireless communications and routes the data call through the intranet 21, enabling two-way packet data communications with the data center 31. The data center 21 includes a content switch 33 enabling communication with servers within the data center 31. The content switch is a next generation type packet switch, which is essentially an intelligent router. The center 31 will have a number of servers providing both web type interactivity and stored software for downloading. In the example, the center has two types of servers, production servers 35 for traditional postpaid transactions as well as servers 37 for repaid services. The two types of servers store and distribute substantially the same software programs and related content. The servers differ, however, in how they handle transactions for billing purposes. The data center equipment may route each call to an available one of the appropriate servers 35 or 37 based on identification of the particular mobile station 5 and the attendant knowledge that the user thereof is a postpay or prepaid subscriber.

There may be any desired number of each type of server, depending on the customer traffic that the center 31 is designed/expected to service. In the example, the data center 31 includes two prepaid servers 37 and five postpaid production servers 35. Actual application software may be written by any content provider, and loaded from the content provider's server 39 into the application download servers (ADSs) 35, 37.

The servers 35, 37 at least support one type of software download, for example, BREW. However, it is envisaged that within the two sets of servers or in a separate data center (not shown), some servers may support alternate types of software downloads, such as J2ME, or the like. Alternatively, some individual server platforms may support multiple types of software download (e.g. one physical platform running two or more "server" routines to distribute the two or more different types of software programming for the mobile stations).

A mobile station 5 communicates with an ADS type server 35 or 37 to authenticate the station 5 and the user. After authentication, the server transmits one or more pages through the network 1 for display on the station 5, listing available programs and providing other information related to downloading and purchasing the applications. If the network 1 offers applications in multiple formats (BREW, J2ME, etc.), the mobile station 5 is typically compatible with only one software type (e.g. only BREW). The server therefore determines the software compatibility of the particular user's station 5 and limits the catalog to the available programs of the appropriate type (e.g. BREW). If the user has an established preference, the data center 31 also limits the applications and related content listed in the catalog and/or organizes/prioritizes the software listed in the catalog based on the established preference, as will be described in more detail, later.

The user peruses the received catalog listing and selects one or more items, and the mobile station 5 transmits the selection information through the network 1 to the ADS 35 or 37. In response, the ADS server 35 or 37 transmits the selected software back through the network 1 to the station 5, which stores it in local memory.

The server 35 or 37 stores a record of the purchase transaction for billing purposes. If the active server is one of the postpay servers 35, it stores the transaction data and supplies that data to a normal billing system (not shown), for example, for inclusion of the price on the user's next monthly bill. If the active server is one of the prepaid servers 37, it will have checked the user's prepaid account balance to see if there was enough remaining to cover the cost, before downloading the selected software. After the download, the server 37 initiates a process to deduct the cost of the software sale price from the user's prepaid amount. Those skilled in the art will be familiar with mobile services, software downloading services, and associated accounting operations, therefore, further detailed explanation should not be necessary here.

To enhance the software download service, the catalog presentation for each user is personalized. In one example, the individual users can self-subscribe to custom catalogs of available programming, by providing filter criteria, which the download systems use to filter the listing of available programs that are presented to the particular user. In another example, the user-input preferences may specify priorities for organizing items in the catalogs. In addition or as an alternative to user specified priorities or filter criteria, the preferences may utilize other types of information, such as user demographic information and/or history data relating to usage of the network and/or download service. For purposes of further discussion of the example of FIG. 1, it will be assumed that the provider allows users to effectively "self-subscribe" to their own custom catalogs, by inputting preference information, for example relating to filter criteria or priority.

In the example, to allow a user to self-subscribe to one or more personalized software catalogs, the provider operates a server or the like 41 for an on-line site for interaction with the users. The server 41 may take the form of a web server, which may be a standalone server connected to the network 21 as shown or to the Internet 11. In a web server implementation, such as that shown, the subscription server 41 is accessible both from mobile stations 5 and from other data devices 13. In practice, the functions of subscription server 41 may be implemented in one of the ADS servers 35, 37 or in another server within the data center 31. Those skilled in the art will recognize that the subscription server functionality provided by the web-based subscription server 41 in the example may be provided by other types of interactive user interface, and that such other forms may be on-line for data communication access or available for dial-up voice response type user interaction.

This discussion will focus on use of the server 41 to allow users to self-subscribe to personalized catalogs, for the program download service. The server 41 may provide a variety of other related functions, such as on-line customer support and/or on-line initial subscription to the download service and/or to other services available through the network 1.

The network 1 includes one or more databases, for storing information relating to the download service. For convenience, this will be referred to as a single database 43, although those skilled in the art will recognize that the data storage may be spread across multiple hardware platforms and/or be implemented as multiple databases. Although shown separately for discussion purposes, the database 43 may reside in any server in the data center 31, on the subscription server 41, or on another computer. However, as will be discussed more fully below, various servers of the data center 31 and the server functionality 41 have access to the database(s) 43, as represented by the dashed-line arrows in FIG. 1

In the example, the database 43 stores information regarding the available programs offered by the service from the data center 31. The database 43 also stores information about the mobile stations 5, such as the type of station and thus the type of programs that each station is capable of running and the type of billing subscription (postpay or prepaid). Furthermore, the database 43 stores user specific information, and for purposes of the present discussion, the stored user specific information includes preference data used to customize or personalize the catalog presentations.

The user may access the subscription server 41 from a mobile station 5 via a packet data service call, similar to the call to the data center 31. Alternatively, the user may access the web server 41 from any other data communication device, such as from a home PC 13, via the Internet 11 and the network provider's intranet 21. The server 41 will execute an identification and password routine, and/or other security functions, to identify and authenticate the user. The server provides a browser interface to allow the user to interact with the catalog self-subscription function. Essentially, the server 41 provides the user with instructions and information about the download service and the available software, to allow the user to select one or more categories of personal interest to the user for filtering, or to allow the user to input various personal priorities.

A typical software downloading service from the ADS data servers 35, 37 may offer a variety of different types of application programming and some related content. Examples of categories may include information, commercial, entertainment, gaming, productivity, location-related applications and communications. Within each category, there may be a number of sub-categories. For example, a service offering "communications" applications may offer a number of different e-mail programs and several different ringers. A service that offers gaming may offer different game categories, by age and/or game type. Productivity tools may include calendars, contact directories, etc.

The server 41 obtains data regarding available programs, which are compatible with the user's station 5, from the database 43. The server 41 sends pages presenting this information and any information appropriate for guiding the user through the preference selection process, to the user's station 5 or to the user's PC 13. If the user has an existing preference profile, the server 41 may allow the user to view the profile and/or review other data as to the user's existing preferences and modify/update the profile as desired.

Essentially, the interaction via the web server 41 allows a user to select one or more categories and sub-categories of interest and/or order categories and sub-categories, in a user-desired manner. For example, one user may have an interest in games for a certain age bracket and news/weather type information. That user might select to receive a catalog limited to games and new/weather information and have the available game information listed before any listing of available news/weather type application programming or content. This first example involves both filtering (limiting to items passing the filter criteria) and prioritizing of the filtered results. Another user may opt to receive the entire catalog of available compatible programs but prioritized to show categories and/or sub-categories of interest higher in the catalog menu tree. Through the interactive process with subscription server 41, the user establishes a profile or modifies an existing profile regarding the user's catalog preference(s), and upon completion, the server 41 stores the profile data in the appropriate record in database 43. A software architecture for implementing this process and managing the database records is discussed in more detail with regard to FIG. 2; and a database schema is discussed with regard to FIG. 3.

In the example of FIG. 1, the user's profile includes at least one selection of a preference input by the user, such as a category or a prioritization order. The user may also input demographic data. Alternatively, the system may also use external demographic data about the user, for example, age and income or area of residence from the user's account record with the mobile service carrier, to derive or modify preferences in the user's profile. Additional preferences may be derived or existing preferences modified, based on usage history. If provided, the additional information (e.g. demographics and/or usage) may be used together with the user's selected preference input, to establish one or a set of filter criteria or to define and refine priorities. The resultant preference information forms 'profiles' of the users, for purposes of developing personalized catalogs of the available software.

Subsequently, when the user operates the mobile station 5 to access one of the ADS servers 35 or 37, a server in the data center 31 accesses the user's profile in the database 43, before presenting program catalog information to the user. If there is no profile for this user, the server would use a default catalog presentation. However, if the user has a profile, as in our example, the responding server filters and/or organizes the data regarding available software in accord with one or more preferences defined by the profile. In one or the earlier examples, the server might identify games available for the station 5 that fit the selected age bracket and lists those first, and the server identifies any compatible news/weather type programming or content and lists such items after the games. In this manner, the server compiles and sends a customized list or 'catalog' for this user. The catalog may be textual or may include a variety of multimedia components. It is also envisaged that the resultant catalog may itself be a BREW or J2ME application download.

The processing to this point has resulted in transmission of the personalized 'catalog' through the network 1 to the calling user's mobile station 5 for presentation. The user reviews and considers the customized catalog and may select from among the available software materials. If the user is interested in additional software, the user may request and receive additional catalog information, based on the profile or using default menus. If the user identifies a program for downloading from the presentation, the user inputs a selection of that program, and the mobile station 5 transmits that selection through the network 1 to the appropriate application download server (ADS) 35 or 37. The ADS server 35 or 37 processes the selection, and if otherwise valid, responds by transmitting the selected software back through the network for loading into the user's mobile station 5, in the normal manner.

FIG. 2 is a block diagram useful in explaining an exemplary software implementation of the catalog manipulation. As outlined above, the catalog presentation development activities utilize information from a database 43. The data in the database may be input and changed or accessed and used by various network entities. A customer preference database interface routine provides unified management and control of the data in the database 43.

Block 47 represents the website software system, for example running on the subscription server 41 (FIG. 1), which provides the on-line interactive user interface for input of catalog preference information. Block 49 represents another system or software module that reads historic usage data or other personal data and automatically signs users up to software preferences. The system 49 receives other types of user-related data from sources not separately shown, for example, demographic data for the user and the user's history of usage data.

Both systems 47, 49 supply preferences to the database interface 45, for storage in the appropriate user records in the database 43. The system 47 derives preference data in an appropriate format from the user inputs via the website. The automatic data processing system 49 pareses, filters or otherwise processes the demographic data for the user, the user's history of usage data, or any other relevant personal data, to form or modify one or more preferences for the user, similar to the preferences formed or modified in response to the user inputs via the website software system 47.

Based on their respective operations programming, the systems 47 and 49 formulate preferences for updating users' profile records in the database 43 and supply the preference information to the customer preference database interface 45. The database interface 45 checks the data for validity, and if valid, enters or updates the user profiles according to the received preference information.

The database 43 also stores information regarding the applications and/or content available through the download service, including certain characteristic information utilized in the catalog filtering process. An application manager routing 50 establishes and updates the data regarding the available applications and provides that data to the database interface 45. The database interface 45 manipulates the records in the actual data tables of database 43, in this case to maintain up to date information about all software items that are available for downloading.

In the example of FIG. 2, one (or more) of the servers in the data center implements a proxy 51, for customer application preference. The software 51 provides the logical interactive interface for the client software 52 running in a user's mobile station 5.

In this example, the network offers at least two different software download services, one based on BREW and one based on J2ME software. Hence, the customer application preference proxy 51 has two associated modules 53 and 55. The module 53 enables the customer application preference proxy 51 to interface with a server 57 that stores and downloads BREW application software. The J2ME module 55 enables the proxy 51 to interface with a server 59 that stores and downloads J2ME type Java-based software applications. For this part of the discussion and in the example of FIG. 2, the "servers" 57, 59 represent server programming running on the same or separate hardware platforms, such as one or more of the server computers 35, 37 in the network example of FIG. 1. Additional servers (hardware and/or software) may be provided to handle additional types of applications and/or to service additional customer traffic. Physically, the customer application preference proxy 51 may run as a front end routine, on one of the server computers 35, 37; or the proxy 51 may reside on a separate server computer in the data center 31.

The customer application preference proxy 51 effectively acts as an intermediary between the client software 52 in the mobile station 5 and the server software 57 or 59. From the point of view of the client in mobile station 5, the proxy acts much like a server routine. From the point of view of the server software 57 or 59, the proxy acts much like a client routine. The proxy operation enables manipulation of catalog information based on individual users' preferences stored in the database 43. Hence, the proxy acts as a database user to obtain relevant information through the customer preference database interface 45.

FIG. 3 shows an exemplary database structure, which may be helpful in understanding an implementation of the personalized catalog presentation for software downloading services in a mobile network context. The records or tables illustrated in FIG. 3 might be used in the database 43, in the network 1 of FIG. 1. The database 43 may reside on any appropriate computer coupled for data communication in the network, though preferably it resides in a location close to or otherwise readily accessible by the customer application preference proxy 51.

As shown, the database 43 might include a user table (USER_TABLE) 61, a group table (GROUP_TABLE) 63, an application table (APP_TABLE) 65, a preference group table (PREF_GROUP_TABLE) 67 and a group user table (GROUP_USER_TABLE) 69. The user table 61, for example, specifies user identification and related information and contains one or more preference group IDs, which may be used to point to the user's selected preference group tables 65. The group table 63 contains a group ID and name and an application ID. The application table includes an identification and name for each application as well as descriptive information and the type/category of the named application.

During a download call, for example, the proxy 51 would query the customer preference database interface 45. The database management software will first check which user is connecting, by means of the USER_TABLE 61 and a user identification supplied by the proxy (e.g. the MIN of the calling customer). The userID will be used to check which preference groups the user is assigned within the PREF_GROUP_TABLE 67. When all the preference groups of which that user is a member are gathered, the system will create a custom view for that user by searching for the applications that are a part of each preference group, using the PREF_GROUP_TABLE 67 and APP_TABLE 65.

Figure 4:
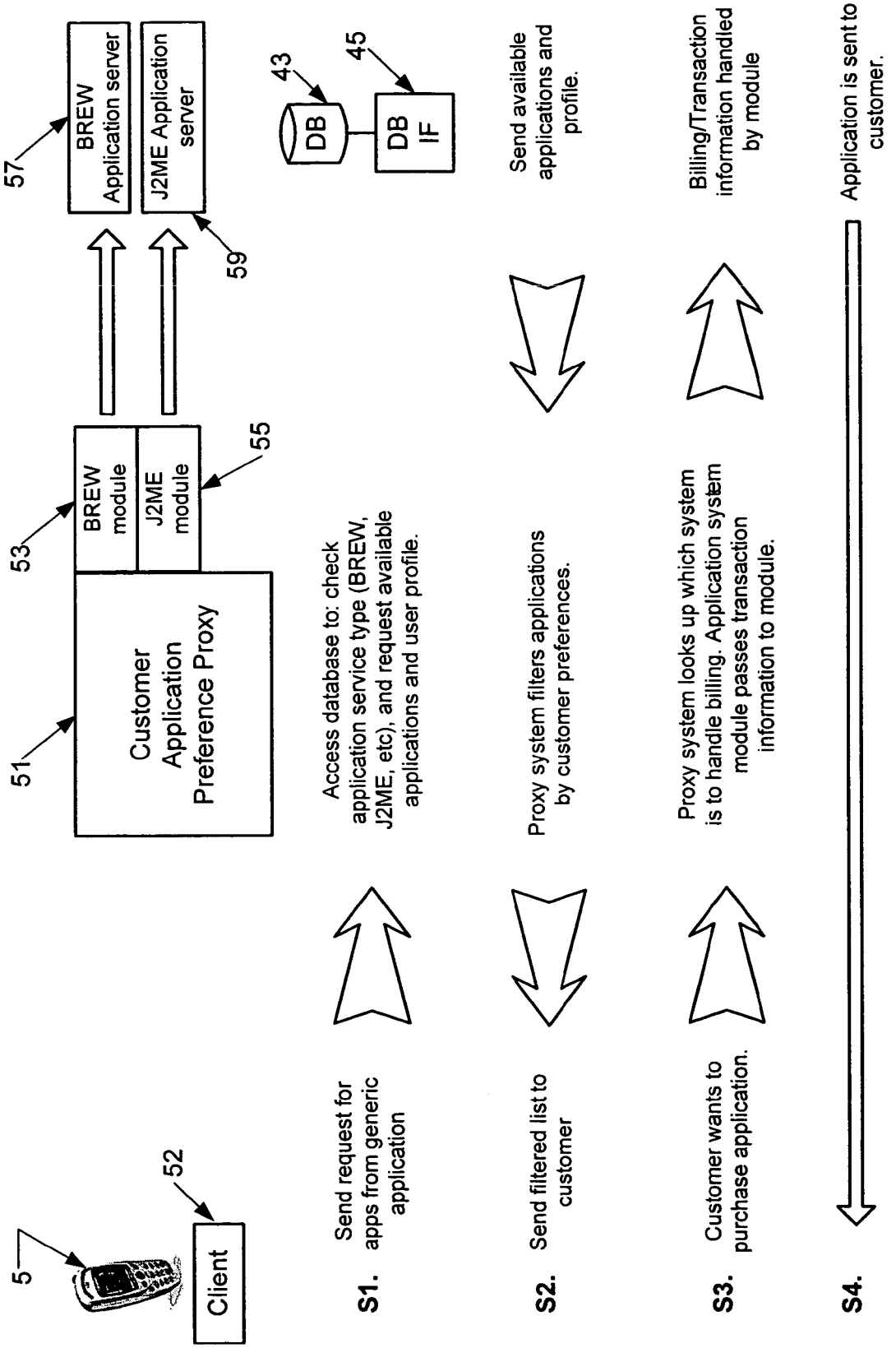
FIG. 4 is a flow chart useful in explaining an example of a process to present a personalized catalog to the user, obtain a software selection from the user, and download the selected software.

FIG. 4 provides a flow-chart useful in explaining an application download procedure, with the presentation of a personalized catalog to the user. In the first step of the exemplary method (at S1 in FIG. 4), the user's mobile station 5 (client 52) sends a request to access the software downloading service. Call set-up and station/user authentication steps are omitted, here, for convenience of illustration and discussion. In response to the request, the customer application preference proxy 51 accesses the database 43 (see also FIG. 2) and checks to determine the application service provider (BREW, J2ME, etc.) that the user's station 5 is setup for. Based on this determination, the proxy 51 sends a request through the interface 45, requesting information from the database 45 regarding the available applications that are compatible with the particular user's station 5 and requesting the user's profile.

In the next step (S2), the database 45 and the interface 45 provide a listing of available software to the customer application preference proxy 51. Typically, this listing includes all available programs that are compatible with the particular model of mobile station 5. The customer application preference proxy 51 also receives a profile for the user of mobile station 5, including the user's preferences, from the database 43. As part of the processing at S2 in FIG. 3, the customer application preference proxy 51 applies the user profile preferences to the received list of applications, e.g. to filter or prioritize the available catalog information. In the filter example shown, the proxy 51 limits the information about available software to those applications meeting certain criteria specified by the profile and organizes or prioritizes the remaining information in accordance with any preference specified in the profile. Of course other filtering schemes and other techniques to arrange the filtered data may be utilized, and the catalogs could include information about other forms of available software. In the example, the customer application preference proxy 51 sends the filtered information regarding available applications through the network to the mobile station 5, for presentation to the user.

The customer views and/or listens to the received information regarding available software. Although not shown, the user may request and review additional information, for example, with regard to additional available software items. From the received information, typically, the customized catalog listing, the customer selects an application the user desires to purchase.

The user/customer operates the mobile station 5 to indicate that the customer wants to purchase the selected application, and a message to that effect is sent through the network to the customer application preference proxy 51 (see S3 in FIG. 4). The proxy system 51 looks up which system 57 or 59 is to handle billing and the appropriate application system module 53 or 55 passes the transaction information to the respective server 57 or 59. The server 57 or 59 sends the requested application back through the network to the mobile station 5, and makes an appropriate transaction record regarding of the software purchase, in the normal manner (see S4 in FIG. 4). The mobile station 5 receives and stores the downloaded software, in this case the selected application; and the user may later select and run the application on the station 5, as or whenever desired.

As shown by the above discussion, many of the functions relating to the catalog manipulation and distribution and the attendant downloading of selected software are implemented on computers connected for data communication via the components of the network 1. The relevant functions may be performed in servers such as 35, 37 and 41 shown in FIG. 1 implementing the programs shown in FIG. 2. The hardware of such computer platforms typically is general purpose in nature, albeit with an appropriate network connection for communication via the intranet 21, the Internet 11 or other data networks that may connect into the network 1.

As known in the data processing and communications arts, each such general-purpose computer typically comprises a central processor, an internal communication bus, various types of memory (RAM, ROM, EEPROM, cache memory, etc.), disk drives or other code and data storage systems, and one or more network interface cards or ports for communication purposes. The computer system also may be coupled to a display and one or more user input devices (not shown) such as alphanumeric and other keys of a keyboard, a mouse, a trackball, etc. These display and user input element(s) together form a service-related user interface, for interactive control of the operation of the particular general-purpose computer system. These user interface elements may be locally coupled to the computer system, for example in a workstation configuration, or the user interface elements may be remote from the computer and communicate therewith via a network. The elements of such a general-purpose computer system also may be combined with or built into routing elements or nodes of the network, such as the IWF or the MSC.

The software functionalities (e.g. in FIG. 2) involve programming, including executable code as well as associated stored data. The software code is executable by the general-purpose computer that functions as the particular server, e.g. 35, 37 or 41 (FIG. 1). In operation, the code and possibly the associated data records are stored within the general-purpose computer platform. At other times, however, the software may be stored at other locations and/or transported for loading into the appropriate general-purpose computer system. Hence, the embodiments involve one or more software products in the form of one or more modules of code carried by at least one machine-readable. Execution of such code by a processor of the computer platform enables the platform to implement the catalog and/or software downloading functions, in essentially the manner performed in the embodiments discussed and illustrated herein.

As used herein, terms such as computer or machine "readable medium" refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in any general-purpose computer(s) programmed to operate as one of the server platforms 35, 37 or 41 of FIG. 1. Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The above discussion of the hardware and software relates only to examples of components that may be used to implement the personalized software catalog presentations. Those skilled in the art will recognize that other hardware platforms and/or other types or arrangements of the software may provide substantially the same overall functionality. For example, instead of using a single database and common interface, a download service might use a number of separate databases. The station related data and/or customer profile records might reside in a database closely associated with the customer application preference proxy; and each application server type (BREW, J2ME, etc.) might maintain its own database of information about its respective available applications.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of distributing software to one of a plurality of mobile stations through a wireless communication network, comprising:

receiving a preference, for a user of the one mobile station;

receiving a request for access to a software distribution service, through the wireless communication network, from the one mobile station;

processing information regarding available software in accord with the received preference, to produce a catalog of available software personalized for the user;

transmitting the personalized catalog through the network to the one mobile station, for presentation to the user;

receiving a user selection of an item of software from the personalized catalog, through the wireless communication network, from the one mobile station; and downloading the selected software item into the one mobile station through the wireless communication network, wherein:

the available software includes a plurality of applications programs implemented in accord with each of at least two different software standards;

the one mobile station is compatible with only one of the two software standards; and the processing further comprises limiting the personalized catalog to include only programs implemented in accord with the one software standard.

2. The method of claim 1, wherein the at least two different software standards comprise BREW (binary runtime environment for wireless) and J2ME (Java 2 Platform, Micro Edition).

3. The method of claim 1, wherein the selected software item comprises an executable application program, and the method further comprises executing the application program in the one mobile station.

4. The method of claim 1, wherein the step of receiving the preference comprises:

presenting the user with information regarding self-subscription; and receiving a preference selection as an input from the user.

5. The method of claim 4, wherein the step of receiving the preference selection from the user comprises receiving the user input from the one mobile station through the wireless communication network.

6. The method of claim 4, wherein the step of receiving the preference selection from the user comprises receiving the user input from a data communication device through the Internet.

7. The method of claim 4, further comprising receiving and processing demographic data regarding the user or usage history data for the user to modify the preference.

8. The method of claim 1, wherein the step of receiving the preference comprises receiving and processing demographic data regarding the user or usage history data for the user to derive the preference.

9. The method of claim 1, wherein:

the received preference defines at least one filter criteria; and the step of processing comprises forming a listing consisting only of available software items that pass said at least one filter criteria.

10. The method of claim 1, wherein:

the received preference defines a priority order; and the step of processing comprises organizing a listing of available software items in the defined priority order.

* * * * *